United States Patent
Zhou

(10) Patent No.: US 8,626,439 B2
(45) Date of Patent: Jan. 7, 2014

(54) NAVIGATION SYSTEM WITH TRAFFIC ESTIMATION MECHANISM AND METHOD OF OPERATION THEREOF

(75) Inventor: Leqing Zhou, Sunnyvale, CA (US)

(73) Assignee: Telenav, Inc., Sunnyvale, CA (US)

( * ) Notice: Subject to any disclaimer, the term of this patent is extended or adjusted under 35 U.S.C. 154(b) by 318 days.

(21) Appl. No.: 12/833,892

(22) Filed: Jul. 9, 2010

(65) Prior Publication Data

US 2012/0010807 A1    Jan. 12, 2012

(51) Int. Cl.
*G01C 21/36* (2006.01)
*G01C 21/34* (2006.01)

(52) U.S. Cl.
CPC ........ *G01C 21/3453* (2013.01); *G01C 21/3461* (2013.01); *G01C 21/3492* (2013.01); *G01C 21/3691* (2013.01)
USPC .......................................... 701/423; 701/465

(58) Field of Classification Search
USPC .................................. 701/200, 204, 207, 465
See application file for complete search history.

(56) References Cited

U.S. PATENT DOCUMENTS

| | | | |
|---|---|---|---|
| 5,862,509 A * | 1/1999 | Desai et al. ................... | 701/411 |
| 5,987,377 A | 11/1999 | Westerlage et al. | |
| 6,144,917 A | 11/2000 | Walters et al. | |
| 6,184,802 B1 | 2/2001 | Lamb | |
| 6,856,893 B2 * | 2/2005 | Beesley et al. ................. | 701/533 |
| 7,433,889 B1 | 10/2008 | Barton | |
| 2004/0049338 A1 | 3/2004 | Beesley et al. | |
| 2005/0125143 A1 * | 6/2005 | Beesley et al. ................. | 701/200 |
| 2005/0209772 A1 * | 9/2005 | Yoshikawa et al. ........... | 701/200 |
| 2008/0234927 A1 * | 9/2008 | O'Neill ......................... | 701/204 |
| 2008/0275641 A1 * | 11/2008 | Cummings .................... | 701/204 |
| 2008/0312811 A1 | 12/2008 | Yamane | |
| 2009/0182492 A1 * | 7/2009 | Alten ............................. | 701/200 |
| 2010/0094533 A1 * | 4/2010 | Wu ................................ | 701/200 |
| 2010/0217519 A1 * | 8/2010 | Englerth et al. ............... | 701/204 |

OTHER PUBLICATIONS

International Search Report for PCT Application No. PCT/US2011/041692 dated Oct. 18, 2011.

* cited by examiner

*Primary Examiner* — James Trammell
*Assistant Examiner* — Todd Melton
(74) *Attorney, Agent, or Firm* — IP Investment Law Group

(57) ABSTRACT

A method of operation of a navigation system includes: calculating a travel segment of a navigation route, the travel segment having a travel feature; estimating a base time for the travel segment; estimating an incremental time for the travel feature; and calculating a travel time with the base time and the incremental time for displaying on a device.

20 Claims, 5 Drawing Sheets

NAVIGATION SYSTEM WITH TRAFFIC ESTIMATION MECHANISM AND METHOD OF OPERATION THEREOF

TECHNICAL FIELD

The present invention relates generally to a navigation system, and more particularly to a system for a navigation system with traffic estimation mechanism.

BACKGROUND ART

Modern portable consumer and industrial electronics provide increasing levels of functionality to support modern life including location-based services. This is especially true for client devices such as navigation systems, cellular phones, portable digital assistants, and multifunction devices.

The navigation systems generally provide a recommended route from a starting point to a desired destination. Generally, the starting point and the desired destination are selected from a large database of roads stored in a mass media storage, such as a compact disc read-only memory (CD ROM) or a hard drive, which includes roads of an area to be traveled by a user. The navigation systems can also notify waypoints or times along the route.

As users adopt mobile location-based service devices, new and old usage begin to take advantage of this new device space. Navigation system and service providers are continually making improvement in the notification to enhance the user's experience in order to be competitive.

Thus, a need still remains for a navigation system with traffic estimation mechanism for increasing levels of functionality. In view of ease of use, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: calculating a travel segment of a navigation route, the travel segment having a travel feature; estimating a base time for the travel segment; estimating an incremental time for the travel feature; and calculating a travel time with the base time and the incremental time for displaying on a device.

The present invention provides a navigation system, including: a location unit for calculating a travel segment of a navigation route, the travel segment having a travel feature; a first storage unit, coupled to the location unit, for estimating a base time for the travel segment, the base time stored and accessed in the first storage unit; a second storage unit, coupled to the location unit, for estimating an incremental time for the travel feature, the incremental time stored and accessed in the second storage unit; and a control unit, coupled to the location unit, for calculating a travel time with the base time and the incremental time for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
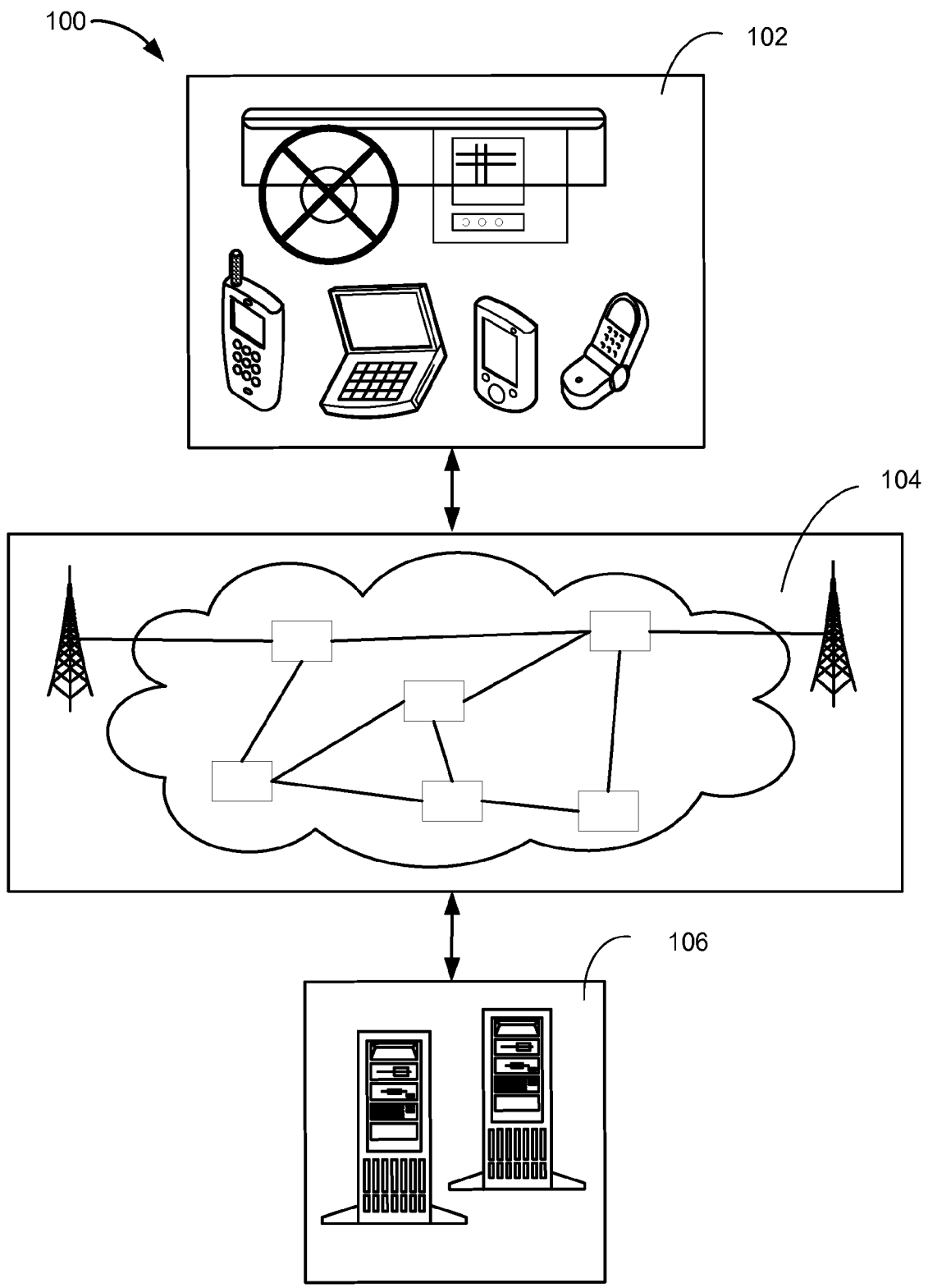
FIG. 1 is a navigation system with traffic estimation mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with traffic estimation mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm C™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
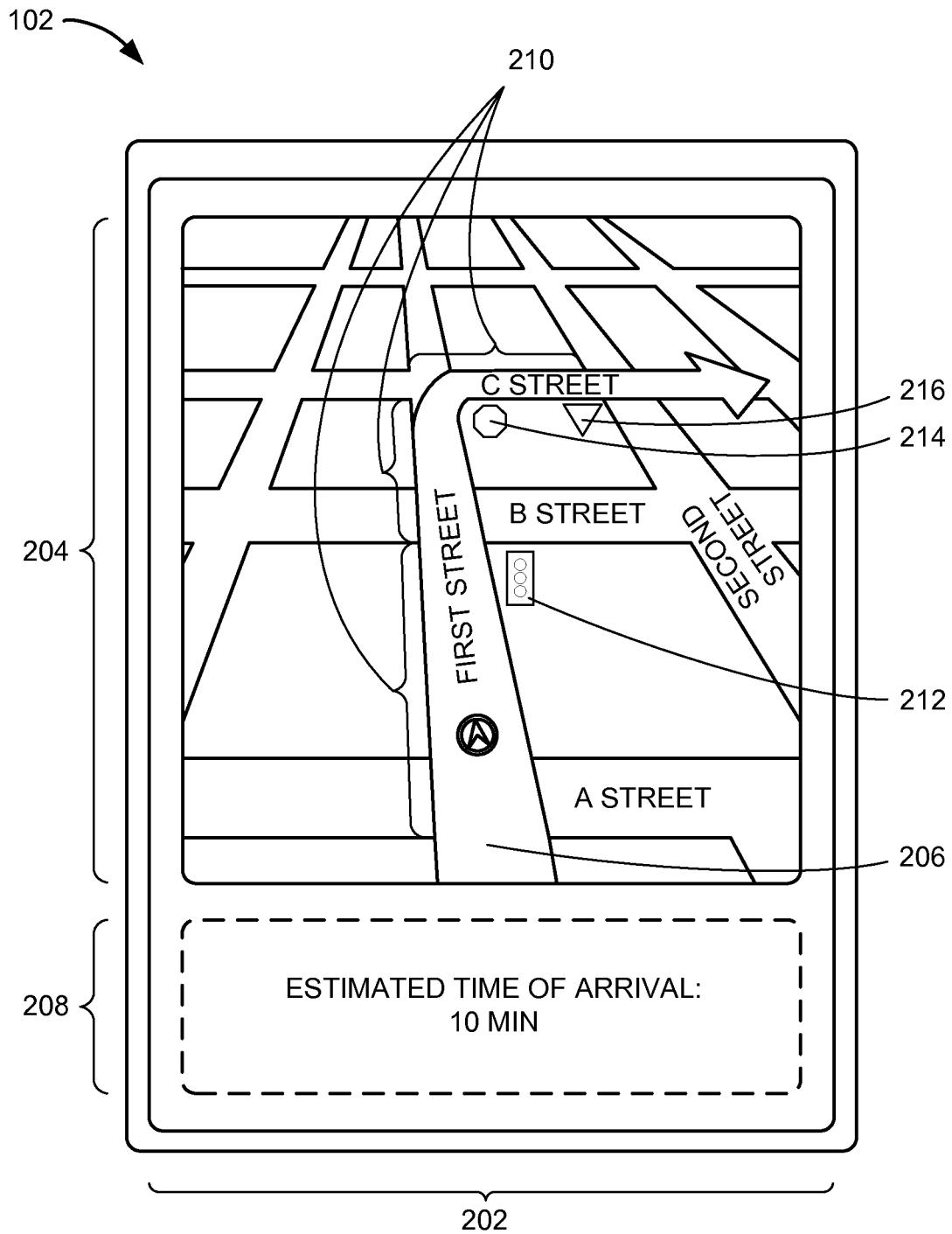
FIG. 2 is an example of a display on a display interface of the first device.

Referring now to FIG. 2, therein is shown an example of a display on a display interface 202 of the first device 102. The display is defined as a visual presentation of navigation information. For example, the navigation information can be a map, a street name, a turn-by-turn instruction, or any relevant information for navigation purposes.

The display interface 202 is defined as an electronic device that presents the navigation information in a visual form. The display interface 202 can include a display device, a projector, a video screen, or any combination thereof.

The display interface 202 can present a navigation map 204, which is defined as a visual presentation of a geographical area. The navigation map 204 can include a navigation route 206, which is defined as a path for travel from an origin to a destination.

The display interface 202 can present a message 208, which is defined as a notification related to the navigation information. For example, the message 208 is shown as "ESTIMATED TIME OF ARRIVAL: 10 MIN" to provide an estimation of an arrival time at the destination.

The message 208 is shown in a textual representation, although it is understood that the message 208 can be presented with any visual, audible, or mechanical means. For example, the message 208 can be presented with text, images, audio, video, graphics, vibration, or a combination thereof.

The display interface 202 can present a number of travel segments 210, which are defined as portions of the navigation route 206 that are connected from one to another between the origin and the destination. As an example, one of the travel segments 210 is shown along First Street between A Street and B Street, another of the travel segments 210 is shown along First Street between B Street and C Street, and yet another of the travel segments 210 is shown along C Street between First Street and Second Street.

The travel segments 210 can be identified by a traffic light 212, which is a signaling device that guides vehicles when to go, stop, slow down, or a combination thereof. The traffic light 212 can represent a traffic light of a whole intersection.

As an example, the traffic light 212 is shown near an intersection of First Street and B Street in the navigation map 204. As another example, the traffic light 212 can be a stop light, a traffic lamp, a stop-and-go light, or any other visual signal to control a flow of traffic.

The travel segments 210 can be identified by a stop sign 214, which is a visual indicator that informs vehicle drivers to make a complete stop and then proceed only if the way ahead is clear. As an example, the stop sign 214 is shown near an intersection of First Street and C Street in the navigation map 204.

The travel segments 210 can be identified by a yield sign 216, which is a visual indicator that informs vehicle drivers to let other vehicle drivers, pedestrians, or travelers pass and then proceed only if the way ahead is clear. As an example, the yield sign 216 is shown near an intersection of Second Street and C Street in the navigation map 204.

Figure 3:
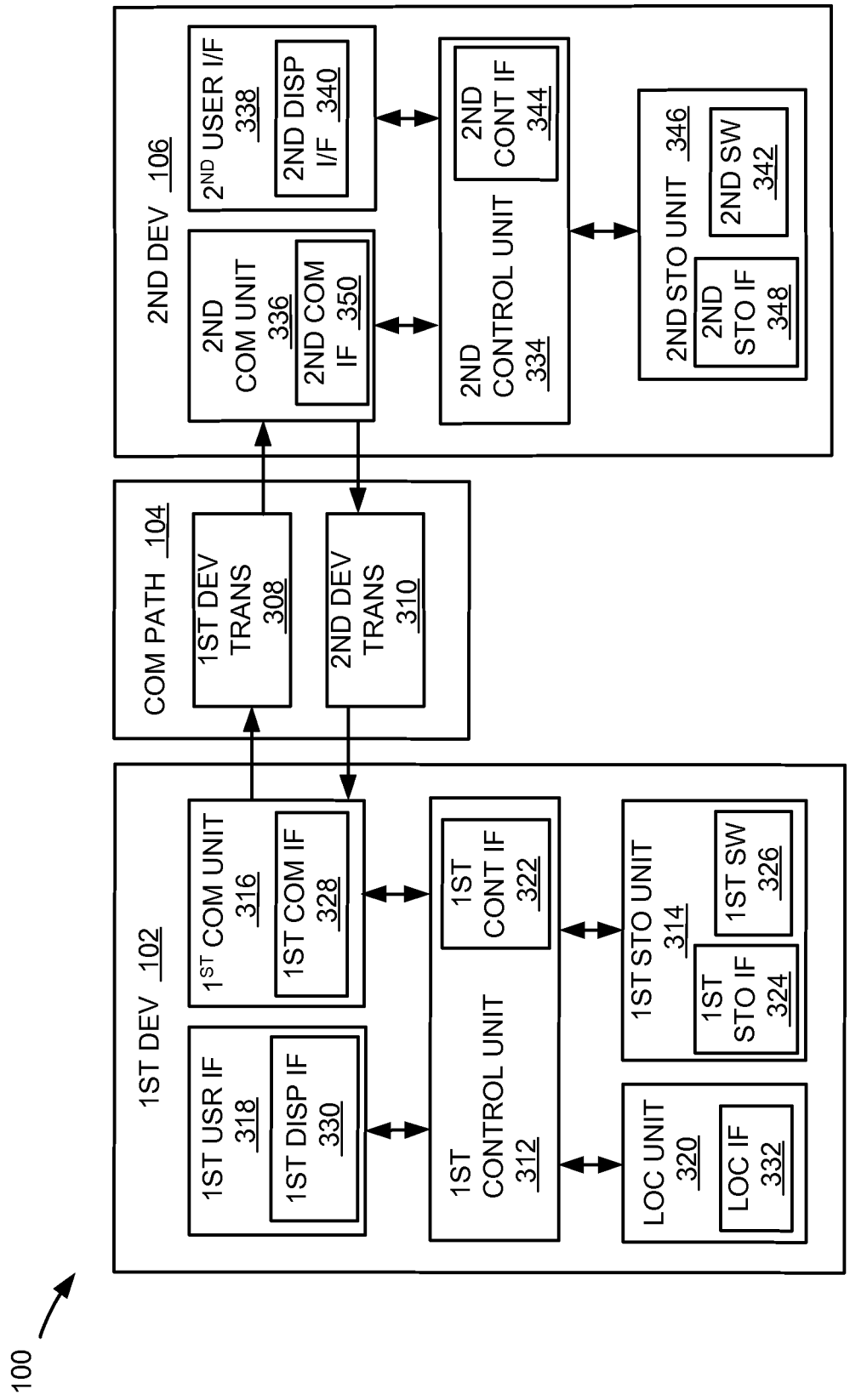
FIG. 3 is an exemplary block diagram of the navigation system.

Referring now to FIG. 3, therein is shown an exemplary block diagram of the navigation system 100. The first device 102 can send information in a first device transmission 308 over the communication path 104 to the second device 106. The second device 106 can send information in a second device transmission 310 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 312, a first storage unit 314, a first communication unit 316, a first user interface 318, and a location unit 320. The first control unit 312 can include a first control interface 322. The first control unit 312 can execute a first software 326 to provide the intelligence of the navigation system 100.

The first control unit 312 can be implemented in a number of different manners. For example, the first control unit 312 can be a processor, an embedded processor, a microprocessor, a hardware control logic, a hardware finite state machine (FSM), a digital signal processor (DSP), or a combination thereof.

The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations external to the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The location unit 320 can generate location information, current heading, and current speed of the first device 102, as examples. The location unit 320 can be implemented in many ways. For example, the location unit 320 can function as at least a part of a global positioning system (GPS), an inertial navigation system, a cellular-tower location system, a pressure location system, or any combination thereof.

The location unit 320 can include a location interface 332. The location interface 332 can be used for communication between the location unit 320 and other functional units in the first device 102. The location interface 332 can also be used for communication that is external to the first device 102.

The location interface 332 can receive information from the other functional units or from external sources, or can transmit information to the other functional units or to external destinations. The external sources and the external destinations refer to sources and destinations external to the first device 102.

The location interface 332 can include different implementations depending on which functional units or external units are being interfaced with the location unit 320. The location interface 332 can be implemented with technologies and techniques similar to the implementation of the first control interface 322.

The first storage unit 314 can store the first software 326. The first storage unit 314 can also store the relevant information, such as advertisements, points of interest (POI), navigation routing entries, or any combination thereof.

The first storage unit 314 can be a volatile memory, a nonvolatile memory, an internal memory, an external memory, or a combination thereof. For example, the first storage unit 314 can be a nonvolatile storage such as nonvolatile random access memory (NVRAM), Flash memory, disk storage, or a volatile storage such as static random access memory (SRAM).

The first storage unit 314 can include a first storage interface 324. The first storage interface 324 can be used for communication between the location unit 320 and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations external to the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, or any combination thereof to provide data and communication inputs.

The first user interface 318 can include a first display interface 330. The first display interface 330 can include a display, a projector, a video screen, a speaker, or any combination thereof. The first display interface 330 can be represented by the display interface 202 of FIG. 2.

The first control unit 312 can operate the first user interface 318 to display information generated by the navigation system 100. The first control unit 312 can also execute the first software 326 for the other functions of the navigation system 100, including receiving location information from the location unit 320. The first control unit 312 can further execute the first software 326 for interaction with the communication path 104 via the first communication unit 316.

The second device 106 can be optimized for implementing the present invention in a multiple device embodiment with the first device 102. The second device 106 can provide the additional or higher performance processing power compared to the first device 102. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 106 of the navigation system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the navigation system 100, including operating the second communication unit 336 to communicate with the first device 102 over the communication path 104.

The second control unit 334 can be implemented in a number of different manners. For example, the second control unit 334 can be a processor, an embedded processor, a microprocessor, a hardware control logic, a hardware finite state machine (FSM), a digital signal processor (DSP), or a combination thereof.

The second control unit 334 can include a second control interface 344. The second control interface 344 can be used for communication between the second control unit 334 and other functional units in the second device 106. The second control interface 344 can also be used for communication that is external to the second device 106.

The second control interface 344 can receive information from the other functional units or from external sources, or can transmit information to the other functional units or to external destinations. The external sources and the external destinations refer to sources and destinations external to the second device 106.

The second control interface 344 can be implemented in different ways and can include different implementations depending on which functional units or external units are being interfaced with the second control interface 344. For example, the second control interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the relevant information, such as advertisements, points of interest (POI), navigation routing entries, or any combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the navigation system 100 is shown with the second storage unit 346 as a single hierarchy storage system, although it is understood that the navigation system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as nonvolatile random access memory (NVRAM), Flash memory, disk storage, or a volatile storage such as static random access memory (SRAM).

The second storage unit 346 can include a second storage interface 348. The second storage interface 348 can be used for communication between the location unit 320 and other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations external to the second device 106.

The second storage interface 348 can include different implementations depending on which functional units or external units are being interfaced with the second storage unit 346. The second storage interface 348 can be implemented with technologies and techniques similar to the implementation of the second control interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second control interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The navigation system 100 can be executed by the first control unit 312, the second control unit 334, or a combination thereof.

For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 320, although it is understood that the second device 106 can also operate the location unit 320.

Figure 4:
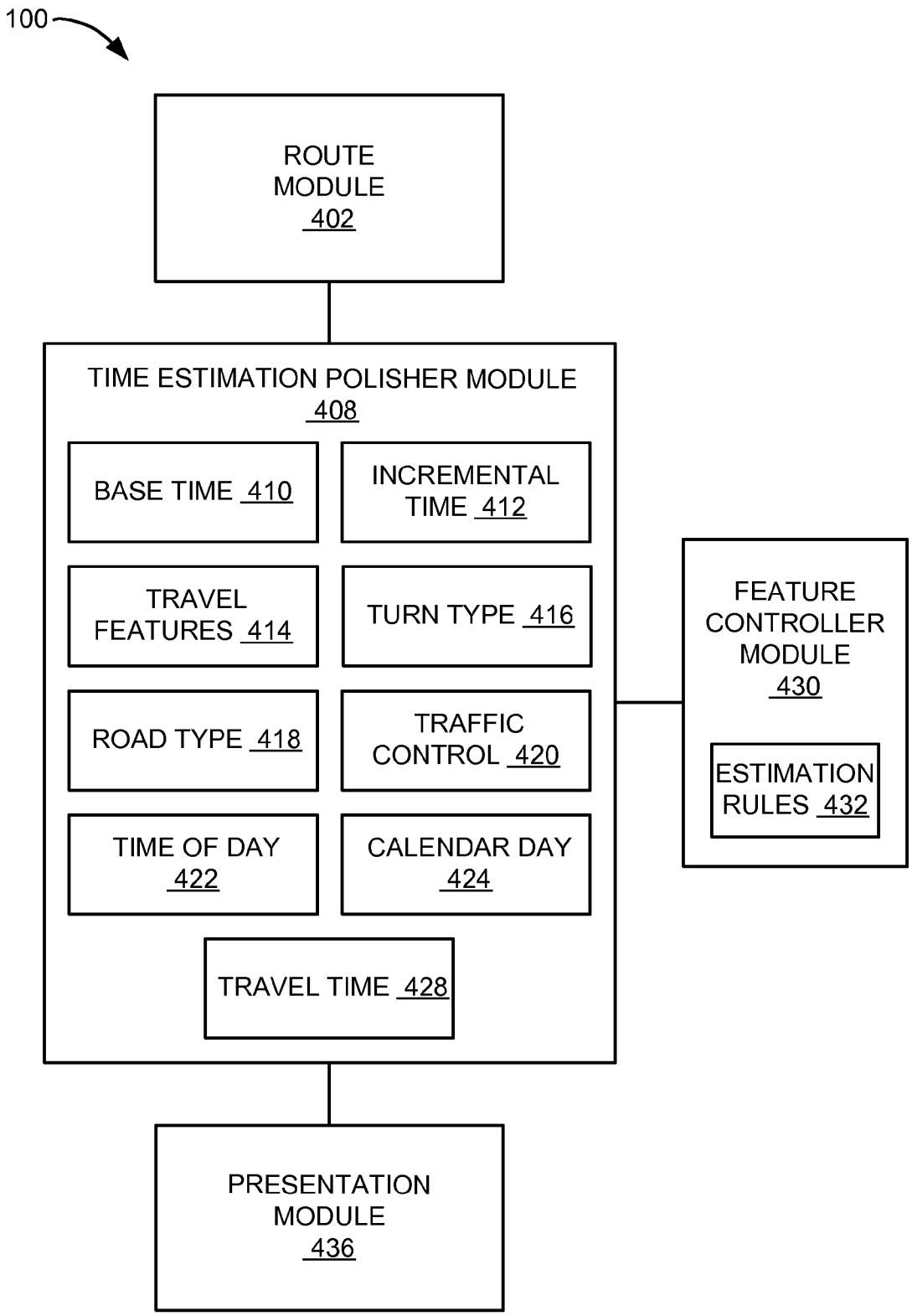
FIG. 4 is a flow chart of the navigation system.

Referring now to FIG. 4, therein is shown a flow chart of the navigation system 100. The navigation system 100 can include a route module 402 to generate driving direction instructions for the navigation route 206 of FIG. 2. The route module 402 can receive a request for route planning and calculate the navigation route 206. The route module 402 can include a routing engine to calculate the navigation route 206.

The navigation route 206 can include the travel segments 210 of FIG. 2. The travel segments 210 can be identified by a change in direction, a change of street names, a difference in road surfaces, or a change in speed limits, as examples. The travel segments 210 can be calculated based on routing configurations such as a desired arrival time, types of routes including fastest routes or shortest routes, waypoints, or any relevant information that can be used for route planning purposes.

The route module 402 can be implemented with the navigation system 100 of FIG. 1. The route module 402 can be implemented with the first control unit 312 of FIG. 3, the first storage unit 314 of FIG. 3, the first communication unit 316 of FIG. 3, the first user interface 318 of FIG. 3, the location unit 320 of FIG. 3, the second control unit 334 of FIG. 3, the second communication unit 336 of FIG. 3, the second user interface 338 of FIG. 3, the second storage unit 346 of FIG. 3, or a combination thereof. For example, the location unit 320 can be used to calculate the travel segments 210 of the navigation route 206.

The navigation system 100 can include a time estimation polisher module 408 to not only calculate but also refine or improve the accuracy of a time of travel. The time estimation polisher module 408 can be coupled to or communicated with the route module 402.

The time estimation polisher module 408 can generate a base time 410, which is defined as an estimated time it takes to travel the travel segments 210. The base time 410 can be estimated for each of the travel segments 210 of the navigation route 206.

The base time 410 can be estimated based on road levels, which refer to conditions of roads. The base time 410 can also be estimated based on traffic conditions, speed limits, or average speeds of the travel segments 210.

The road levels can include road conditions such as road surfaces or road grades. The road surfaces refer to materials that are used to build roads. For example, the materials can include asphalt, concrete, gravel, any other road building materials, or a combination thereof. The road grades refer to gradients or inclinations of roads.

The time estimation polisher module 408 can improve the accuracy of the estimated time of travel by calculating an incremental time 412, which is defined as a buffer or additional time predicted to be needed for the navigation route 206. The incremental time 412 can include a duration that accounts for an additional time that travelers take when traveling along the navigation route 206, excluding a period for rest, idle, allocated times to perform a task at a specified location, overnight stays, or planned or unscheduled maintenance.

The incremental time 412 can be estimated for travel features 414 of the travel segments 210. The travel features 414 are features that affect or factor in a numerical value of an additional time that a vehicle driver has to wait. For example, the additional time can be a time segment that the vehicle driver has to wait at the stop sign 214 of FIG. 2, which can be at one of the travel segments 210 that is on First Street between B Street and C Street.

The travel features 414 can include a turn type 416, which is defined as a change in planar direction from the current heading. The turn type 416 can be specified by the driving direction instruction that guides travelers to change heading along the navigation route 206. A change in the heading can be made at a location where one of the travel segments 210 ends and another of the travel segments 210 begins.

The turn type 416 can include a left turn, a right turn, a u-turn, a curve, or any other change from the current heading along the navigation route 206. As an example, the turn type 416 can be a right turn at the intersection of First Street and C Street in the navigation map 204 of FIG. 2.

For example, a left turn from one of the travel segments 210 to another of the travel segments 210 can typically take more time or have more possibility to wait than other turns. Also for example, a preset amount of time can be required to wait when pedestrians are crossing a street before making a right turn.

The travel features 414 can include a road type 418, which is defined as a characteristic or a category of each of the travel segments 210. For example, the road type 418 can be categorized based on sizes according to a number of lanes, a speed limit, a number of stop lights, a school zone, or an amount of traffic for a given condition, such as a time of day, a day of week, or a calendar day.

The road type 418 can be based on a number of driving lanes of each of the travel segments 210. The road type 418 can be based on types of roads, such as freeways, highways, streets, or any other ways for travel.

As an example, First Street and Second Street in the navigation map 204 can have two lanes in each direction and A Street, B Street, and C Street in the navigation map 204 can have 1 lane in each direction. Since numbers of driving lanes of First Street and Second Street can be larger than those of A Street, B Street, and C Street, the road type 418 of First Street and Second Street can be different from that of A Street, B Street, and C Street.

A difference between the road type 418 and another of the road type 418 at an intersection can affect the calculation of the incremental time 412. For example, less time is required to wait at the traffic light 212 of FIG. 2 at the intersection of First Street and B Street when traveling on First Street, compared to the time required to wait when traveling on B Street. The time difference can be based on First Street having the road type 418 larger than another of the road type 418 of B Street, resulting in the traffic light 212 controlling all four directions of the intersection with a preference for the larger street.

The travel features 414 can include a traffic control 420, which is defined as a visual indicator that is used to control movement of vehicles. The traffic control 420 can include a structure that displays a driving direction, a driving rule, or a traffic message related to laws or regulations for travelers to comply to. The traffic control 420 can include the traffic light 212, the stop sign 214, the yield sign 216 of FIG. 2, or any other visual indicators for guiding vehicles to control the flow of traffic.

The travel features 414 can include a time of day 422, which is defined as a time when the navigation route 206 is planned to be traveled. The time of day 422 can be associated with day, night, carpool hours, or any time segment. For example, the time of day 422 can affect the calculation of the incremental time 412 because the traffic control 420 can be associated with different rules depending on the time of day.

The travel features 414 can include a calendar day 424, which is defined as a day of a week or a date of a year. The calendar day 424 can include a workday, a weekend day, or a holiday. The calendar day 424 can affect the calculation of the incremental time 412 because traffic conditions during workdays can be typically less congested than those during weekend days.

The incremental time 412 can be estimated based on the travel features 414 by assigning a numerical value to each of the travel features 414. The numerical value of each of the travel features 414 can be updated or adjusted with a numerical value that depends on a weight, which is a relative importance of each of the travel features 414.

The relative importance means a criticality or an impact of one of the travel features 414 compared to another of the travel features 414 in the calculation of the incremental time 412 for a given condition, such as a time of day, a day of week, or a calendar day. For example, the numerical value of the yield sign 216 can be updated with a predetermined numerical value that is large on workdays or during traffic hours or with another predetermined numerical value that is small on weekend days.

The numerical value can be adjusted by statistics or probability. For example, a numerical value of one of the travel features 414 can be adjusted to a large predetermined numerical value if the probability of having to wait at the yield sign 216 of FIG. 2 to yield to pedestrians is likely high on holidays in or near a populated area.

Also for example, if the driving direction instructions for the navigation route 206 include the travel segments 210 with highways, the effect of the traffic light 212 at one of the travel segments 210 on the calculation of the incremental time 412 is small. Thus, a numerical value of the traffic control 420 can be assigned to a small predetermined numerical value.

Further, for example, if the driving direction instructions for the navigation route 206 include the travel segments 210 having roads with a number of the traffic control 420, there can be a significant impact (e.g. up to 50%) to the result of the estimation of the incremental time 412. Thus, a numerical value of the traffic control 420 can be assigned to a large predetermined numerical value.

The time estimation polisher module 408 can generate a travel time 428, which is defined as an estimated duration of travel when the navigation route 206 is taken. The travel time 428 can be calculated with a sum or an accumulation of the base time 410 and the incremental time 412. The travel time 428 can be calculated by adding the base time 410 and the incremental time 412.

The time estimation polisher module 408 can be implemented with the navigation system 100 of FIG. 1. The time estimation polisher module 408 can be implemented with the first control unit 312 of FIG. 3, the first storage unit 314 of FIG. 3, the first communication unit 316 of FIG. 3, the first user interface 318 of FIG. 3, the second control unit 334 of FIG. 3, the second communication unit 336 of FIG. 3, the second user interface 338 of FIG. 3, the second storage unit 346 of FIG. 3, or a combination thereof.

For example, the first control unit 312 and the first storage unit 314 can be used to estimate the base time 410 for the travel segments 210, with the base time 410 stored and accessed in the first storage unit 314. Also for example, the second control unit 334 and the second storage unit 346 can be used to estimate the incremental time 412 based on the travel features 414, with the incremental time 412 stored and accessed in the second storage unit 346.

Further, for example, the first control unit 312 can be used to calculate the travel time 428 with the base time 410 and the incremental time 412 for displaying on the first device 102 of FIG. 1. Yet further, for example, the first control unit 312 can be used to estimate the incremental time 412 based on the turn type 416, the road type 418, the traffic control 420, the traffic light 212, the stop sign 214, the yield sign 216, the time of day 422, or the calendar day 424, or to calculate the travel time 428 with the sum of the base time 410 and the incremental time 412.

The navigation system 100 can include a feature controller module 430, which provides numerical values that are associated with the travel features 414. The feature controller module 430 can be coupled to or communicated with the time estimation polisher module 408.

For example, one of the numerical values associated with the travel features 414 can be a numerical value of the traffic control 420 that specifies how long a vehicle driver has to wait to yield to pedestrians at the yield sign 216. Also for example, another of the numerical values associated with the travel features 414 can be a numerical value that is used as the weight by the time estimation polisher module 408 to adjust the numerical value of the traffic control 420 for the given condition.

The feature controller module 430 can generate the numerical values using offline data mining to help improve the accuracy of the results of the calculation of the incremental time 412. The accuracy can be improved using the offline data mining to collect and extract patterns from navigation data related to the travel features 414.

The navigation data collected and extracted can be used to determine average time costs for calculating the numerical values of the travel features 414. The navigation data can also be used to calculate average probability rates for adjusting the numerical values.

The navigation data can be historical data, which are results of previous time estimations. The historical data can include actual values that have been used for calculation of the base time 410, the incremental time 412, the travel time 428, or the numerical values of the travel features 414. The actual values can be stored or accessed in a storage unit for future time estimation purposes.

The feature controller module 430 can control estimation rules 432 used by the time estimation polisher module 408. The estimation rules 432 define conditions that are used by the time estimation polisher module 408 to calculate the incremental time 412.

The estimation rules 432 can be created by the feature controller module 430 according to a sample set of the user's historical real time traffic information. The sample set includes actual numerical values of past wait times of the travel segments 210. For example, the sample set can include an actual numerical value of the incremental time 412 that the vehicle driver had to wait at the traffic light 212 the intersection of First Street and B Street when traveling along First Street.

Accuracy of the estimation rules 432 can be improved. The feature controller module 430 can increase a number of the estimation rules 432 with additional specified conditions to improve the accuracy.

The additional specified conditions can be compared to those of the travel segments 210 by the time estimation polisher module 408. The additional specified conditions that have a high possibility of matching the travel segments 210 during the user's navigation session have similar scenarios as those of the sample set, resulting in an improved accuracy. For example, the additional specified conditions can include the time of day 422 or the calendar day 424 because traffic during peak or rush hours of a day can introduce longer wait times at intersections compared to traffic during non-peak hours at the intersections.

The feature controller module 430 can improve the accuracy by increasing a number of the sample set. The number of the sample set can be increased based on sampled navigation data from a number of users. For example, most of the time, an average numerical value of the incremental time 412 based on 100 users can be more meaningful and accurate compared to that of another of the incremental time 412 based on 10 users.

The feature controller module 430 can also improve the accuracy by updating the navigation data. The navigation data can be updated by replacing old numerical values of the navigation data with new numerical values of the navigation data. The navigation data can be updated according to a calendar year. For example, the navigation data sampled based on a year ago can be better and more accurate than another of the navigation data sampled based on 10 years ago.

The time estimation polisher module 408 can find a best matched rule among the estimation rules 432 according to conditions of each of the travel segments 210 to calculate and return the incremental time 412. The time estimation polisher module 408 can use the estimation rules 432 to compare and calculate the incremental time 412 for each of the travel segments 210 in each direction. Each of the estimation rules 432 that are used to calculate an average numerical value of the incremental time 412 can be associated with the conditions.

The conditions can be associated with the travel features 414, which can include the turn type 416, the road type 418, the traffic control 420, the time of day 422, and the calendar day 424. For example, less time is required to wait at the traffic light 212 at the intersection of First Street with a 50 miles-per-hour speed limit and B Street with a 35 miles-per-hour speed limit when traveling on First Street, compared to the time required to wait before turning left when traveling on B Street.

The feature controller module 430 can be implemented with the navigation system 100 of FIG. 1. For example, the feature controller module 430 can be implemented with the first control unit 312 of FIG. 3, the first storage unit 314 of FIG. 3, the first communication unit 316 of FIG. 3, the first user interface 318 of FIG. 3, the second control unit 334 of FIG. 3, the second communication unit 336 of FIG. 3, the second user interface 338 of FIG. 3, the second storage unit 346 of FIG. 3, or a combination thereof.

The navigation system 100 can include a presentation module 436 to send or display the message 208 of FIG. 2 including information that is reported or presented by the navigation system 100. The presentation module 436 can be coupled to or communicated with the time estimation polisher module 408.

The message 208 can include a response to the request for route planning. The message 208 can include the travel time 428, which can be displayed on a device including the first device 102 or the second device 106 of FIG. 1.

The presentation module 436 can be implemented with the navigation system 100 of FIG. 1. For example, the presentation module 436 can be implemented with the first control unit 312 of FIG. 3, the first storage unit 314 of FIG. 3, the first communication unit 316 of FIG. 3, the first user interface 318 of FIG. 3, the second control unit 334 of FIG. 3, the second communication unit 336 of FIG. 3, the second user interface 338 of FIG. 3, the second storage unit 346 of FIG. 3, or a combination thereof.

It has been discovered that the travel time 428 estimated with the base time 410 and the incremental time 412 based on the travel features 414 is significantly accurate, thereby improving travel time estimation of the navigation route 206.

The physical transformation of data of the base time 410, the incremental time 412, the travel features 414, and the travel time 428 to the navigation route 206 and the message 208 results in movement in the physical world, such as people using the first device 102, the second device 106, or vehicles, based on the operation of the navigation system 100. As the movement in the physical world occurs, the movement itself creates additional information that is converted back to the data for further processing with the base time 410, the incremental time 412, the travel features 414, and the travel time 428 for the continued operation of the navigation system 100 and to continue the movement in the physical world.

Thus, it has been discovered that the navigation system 100 of the present invention furnishes important and heretofore unknown and unavailable solutions, capabilities, and functional aspects for providing an effective and efficient communication.

The navigation system 100 describes the module functions or order as an example. The modules can be partitioned differently. For example, the time estimation polisher module 408 and the feature controller module 430 are shown as separate modules, although the time estimation polisher module 408 and the feature controller module 430 can be implemented in a single module. Also for example, the time estimation polisher module 408 can be embedded or included as part of the routing engine of the route module 402. Each of the modules can operate individually and independently of the other modules.

Figure 5:
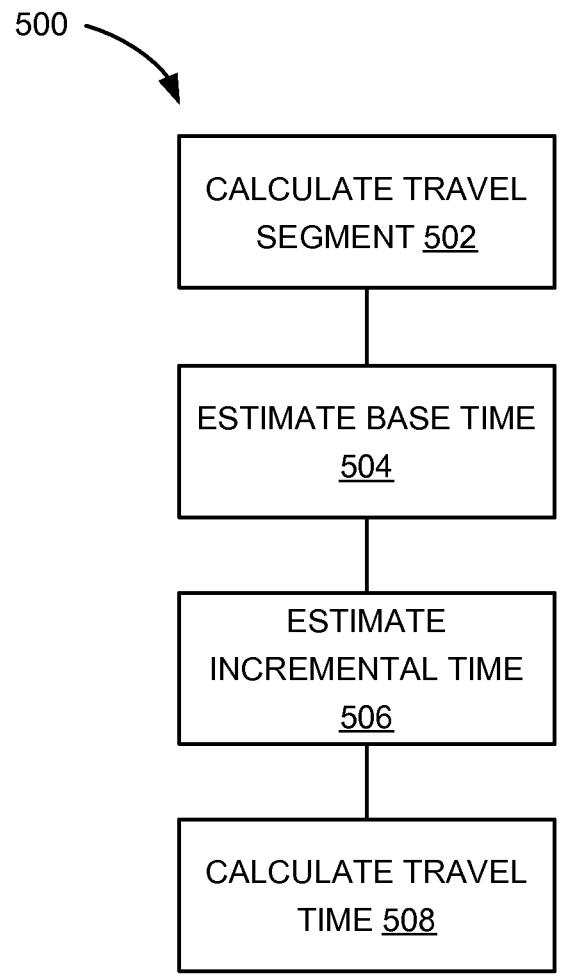
FIG. 5 is a flow chart of a method of operation of the navigation system in a further embodiment of the present invention.

Referring now to FIG. 5, therein is shown a flow chart of a method 500 of operation of the navigation system 100 in a further embodiment of the present invention. The method 500 includes: calculating a travel segment of a navigation route, the travel segment having a travel feature in a block 502; estimating a base time for the travel segment in a block 504; estimating an incremental time for the travel feature in a block 506; and calculating a travel time with the base time and the incremental time for displaying on a device in a block 508.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   calculating a travel segment and a further segment each having a number of lanes, a speed limit, a number of stop lights, or a combination thereof for a navigation route, the travel segment having a travel feature associated with both the travel segment and the further segment;
   estimating a base time for the travel segment;
   estimating an incremental time for the travel feature with a control unit based on a difference between the travel segment and the further segment in the number of lanes, the speed limit, the number of stop lights, or a combination thereof; and
   calculating a travel time with the base time and the incremental time for displaying on a device.

2. The method as claimed in claim 1 wherein estimating the incremental time includes estimating the incremental time for a turn type.

3. The method as claimed in claim 1 wherein estimating the incremental time includes estimating the incremental time for a road type based on a school zone, an amount of traffic for a given condition, or a combination thereof.

4. The method as claimed in claim 1 wherein estimating the incremental time includes estimating the incremental time for a traffic control.

5. The method as claimed in claim 1 wherein estimating the incremental time includes estimating the incremental time for a traffic light.

6. A method of operation of a navigation system comprising:
   calculating a travel segment and a further segment each having a number of lanes, a speed limit, a number of stop lights, or a combination thereof for a navigation route, the travel segment having a travel feature associated with both the travel segment and the further segment;
   estimating a base time for the travel segment;
   estimating an incremental time for the travel feature with a control unit based on a difference between the travel segment and the further segment in the number of lanes, the speed limit, the number of stop lights, or a combination thereof; and
   calculating a travel time with a sum of the base time and the incremental time for displaying on a device.

7. The method as claimed in claim 6 wherein estimating the incremental time includes estimating the incremental time for a stop sign.

8. The method as claimed in claim 6 wherein estimating the incremental time includes estimating the incremental time for a yield sign.

9. The method as claimed in claim 6 wherein estimating the incremental time includes estimating the incremental time for a time of day.

10. The method as claimed in claim 6 wherein estimating the incremental time includes estimating the incremental time for a calendar day.

11. The method as claimed in claim 6 wherein the control unit is for estimating the incremental time for a turn type.

12. The method as claimed in claim 6 wherein the control unit is for estimating the incremental time for a road based on a school zone, an amount of traffic for a given condition, or a combination thereof.

13. The method as claimed in claim 6 wherein the control unit is for estimating the incremental time for a traffic control.

14. The method as claimed in claim 6 wherein the control unit is for estimating the incremental time for a traffic light.

15. A navigation system comprising:
   a location unit for calculating a travel segment and a further segment each having a number of lanes, a speed limit, a number of stop lights, or a combination thereof for a navigation route, the travel segment having a travel feature associated with both the travel segment and the further segment;
   a control unit, coupled to the location unit, for:
      estimating a base time for the travel segment,
      estimating an incremental time for the travel feature based on a difference between the travel segment and the further segment in the number of lanes, the speed limit, the number of stop lights, or a combination thereof, and calculating a travel time with the base time and the incremental time for displaying on a device.

16. The system as claimed in claim 15 wherein the control unit is for calculating the travel time with a sum of the base time and the incremental time.

17. The system as claimed in claim 16 wherein the control unit is for estimating the incremental time for a stop sign.

18. The system as claimed in claim 16 wherein the control unit is for estimating the incremental time for a yield sign.

19. The system as claimed in claim 16 wherein the control unit is for estimating the incremental time for a time of day.

20. The system as claimed in claim 16 wherein the control unit is for estimating the incremental time for a calendar day.

* * * * *